Aug. 31, 1954     A. J. MATTER     2,687,547

GLIDE AND ADAPTER FOR TUBULAR FURNITURE

Filed Aug. 4, 1952

INVENTOR.

Albert J. Matter

Patented Aug. 31, 1954

2,687,547

UNITED STATES PATENT OFFICE 2,687,547

GLIDE AND ADAPTER FOR TUBULAR FURNITURE

Albert J. Matter, Park Ridge, Ill.

Application August 4, 1952, Serial No. 302,600

3 Claims. (Cl. 16—30)

This invention relates to improvements in glide and adapter for tubular furniture legs and has for its object to provide a cup-shaped glide which will conform to the outside and inside of standard tubular furniture legs and means for rigidly attaching it as shown in the illustrations.

I attain this object by means of the device shown in the accompanying drawings in which.

Like numerals of reference indicate similar parts throughout the several views.

A cup shaped glide 1 is perforated and formed with a countersink at 2 to receive a flat-headed screw 3 having a square nut 4.

5 indicates a tubular furniture leg.

Figure 2:
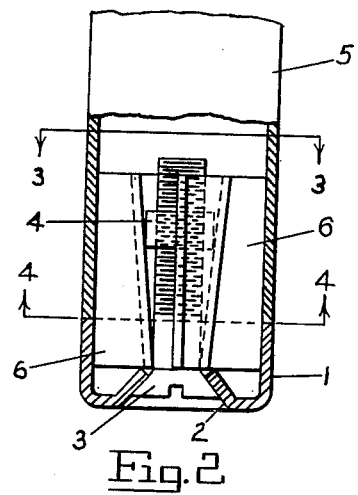
Fig. 2 shows an elevation, partly in cross-section with the square nut screwed downwardly so as to wedge the spreaders tightly against the inside of the tube.
Figure 3:
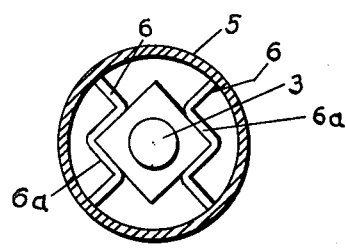
Fig. 3 is a top view of Fig. 2 taken on the line 3—3.
Figure 4:
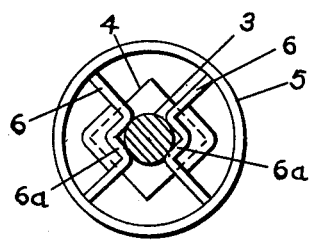
Fig. 4 is a bottom view of Fig. 2 with the glide removed and the screw sectioned at line 4—4.

Two opposed spreaders 6 W-shape in cross section are formed with the inner V portion 6a tapering as shown in Fig. 2 and fitting a square nut 4 freely at the top and tightly near the center and closely fitting the screw 3 at the bottom. That is to say, in Fig. 2 the long free edges of the adapters are all parallel and in engagement with the surrounding tubular member, while the surfaces forming the V's are in engagement with the screw near the head of the latter and with the nut.

Figure 1:
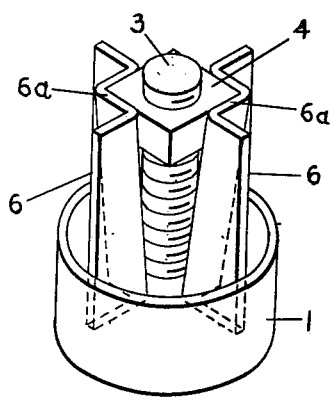
Fig. 1 is a perspective view of the assembled unit with the attaching members compressed ready to insert into the bottom of a tubular leg.

To attach the unit in place the nut 4 is screwed to the top and the adapter spreaders 6 are inserted within the glide, so as to permit easy insertion into the tubular leg 5. While the condition at the time of insertion is illustrated in Fig. 1, it can better be understood from an inspection of Fig. 2. There it will be seen that if the nut is screwed upward the adapters remain in contact with the screw, at their lower ends, whereas the nut clears the way for rocking the adapters to bring their upper ends closer together. This, of course, allows the adapters to be entered into the tube freely.

After inserting the unit into position, tightening of screw 3 forces nut 4 downwardly along the inclined V-shaped portion of the spreader 6 causing the spreaders to rock about their lower ends and thus be spread tightly within the tubing 5 so as to rigidly hold the glide in place.

It will thus be seen that, because the lower ends of the spreaders or adapters fit against the surrounding cylindrical wall of cup-shaped glide 1, the latter has no side play, once it is attached to the tubing, but is accurately centered with respect to the tubing.

Although the preferred form of glide is shown it is understood that this may be shaped as desired without departing from the spirit of the invention.

If preferred, a nut of hexagon or other shape may be used and the spreader V-groove made to conform.

In place of a stamping from flat metal the spreaders may be of solid form with a tapered groove to fit the nut.

More than two spreaders can be used if desired, as for instance three with a triangular or hexagon nut.

Having described my invention, what I claim as new and desire to secure by Letters Patent is:

1. In combination, an object adapted to be attached to and be accurately centered on an end of a tubular member, a screw extending through such object, a plurality of elongated, like adapters set loosely around the screw, said adapters having on their inner sides surfaces which, at one end of the device, contact the screw and diverge from there toward the other end, and a nut on the screw engaged with said diverging surfaces; the parts being so proportioned that, when the nut is in a predetermined intermediate position along the screw, the outer long edges of the adapters form elements in a cylindrical surface, coaxial with the screw and of the same diameter as the internal diameter of a tubular member to which the object is to be attached, while still contacting the screw and, when the nut is moved farther away from the ends of the adapters in contact with the screw, the other ends may rock toward each other.

2. In combination, a cup-shaped glider adapted to be attached to and be accurately centered on the lower end of a tubular member, a screw extending centrally through the glider, a plurality of elongated, like adapters set loosely around the screw and extending at their lower ends into the glider, said adapters having on their inner sides surfaces which, at their lower ends, contact the screw and diverge from there to the upper ends, and a nut on the screw engaged with said diverging surfaces; the parts being so proportioned that, when the nut is in a predetermined intermediate position along the screw, the outer long edges of the adapters form elements in a cylindrical surface, coaxial with the screw and of the same diameter as the internal diameter of the glide, while still contacting the screw and, when the nut is moved upward from said position, the upper ends of the adapters may rock toward each other.

3. In combination, an object adapted to be attached to and be accurately centered on an end of a tubular member, a screw extending through said object, a plurality of elongated, like adapters set loosely around the screw, each adapter being W-shaped in cross section and the central V portions facing each other, the V's increasing in width and depth from one end of the device to the other, and a nut on the screw engaged with the diverging surfaces that form the V's; the parts being so proportioned that, when the nut is in a predetermined intermediate position along the screw, the outer long edges of the adapters form elements of a cylindrical surface, coaxial with the screw and of the same diameter as the internal diameter of the tubular member to which the object is to be attached, and the surfaces forming the small end of the V's are in contact with the screw.

References Cited in the file of this patent

UNITED STATES PATENTS

| Number | Name | Date |
|---|---|---|
| 962,306 | Bryant | June 21, 1910 |
| 1,121,980 | Conrad | Dec. 22, 1914 |
| 1,580,781 | Fitch | Apr. 13, 1926 |
| 1,914,511 | Jones | June 20, 1933 |
| 2,218,581 | Levan | Oct. 22, 1940 |